United States Patent
Nagasawa

(10) Patent No.: US 9,501,255 B2
(45) Date of Patent: Nov. 22, 2016

(54) NETWORK SYSTEM, CODE PROVIDING DEVICE, TERMINAL, AND COMPUTER-READABLE STORAGE MEDIUM FOR COMPUTER PROGRAM

(71) Applicant: KONICA MINOLTA, INC., Chiyoda-ku (JP)

(72) Inventor: Kenichi Nagasawa, Takatsuki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/466,019

(22) Filed: Aug. 22, 2014

(65) Prior Publication Data

US 2015/0077790 A1   Mar. 19, 2015

(30) Foreign Application Priority Data

Sep. 17, 2013  (JP) ................................ 2013-191313

(51) Int. Cl.
  *G06F 3/12*   (2006.01)
  *H04N 1/00*   (2006.01)

(52) U.S. Cl.
  CPC ........... *G06F 3/1285* (2013.01); *G06F 3/1204* (2013.01); *G06F 3/1236* (2013.01); *G06F 3/1292* (2013.01); *H04N 1/00* (2013.01)

(58) Field of Classification Search
  CPC ............. H04L 29/12839; H04L 41/0226; H04L 41/0233; H04L 41/0253; H04L 41/0266; H04L 61/2046; H04L 61/2084; H04L 61/6022
  USPC ............................... 358/1.1–3.31, 1.11–1.18
  See application file for complete search history.

(56) References Cited

U.S. PATENT DOCUMENTS

| | | | |
|---|---|---|---|
| 2007/0019232 A1 | 1/2007 | Kano | |
| 2007/0263258 A1* | 11/2007 | Tsuchibuchi | H04N 1/00363 358/400 |
| 2008/0273461 A1* | 11/2008 | Liang et al. | 370/235 |
| 2009/0244599 A1* | 10/2009 | Tanaka | H04L 61/2046 358/1.15 |
| 2011/0179189 A1 | 7/2011 | Wada | |
| 2012/0191836 A1* | 7/2012 | Ogata | H04L 29/1232 709/223 |
| 2013/0250358 A1* | 9/2013 | Suzuki | 358/1.15 |

FOREIGN PATENT DOCUMENTS

JP   H05-91213 A    4/1993
JP   2002-007251 A  1/2002

(Continued)

OTHER PUBLICATIONS

Notification of Reason(s) for Refusal dated Jul. 21, 2015 issued by the Japanese Patent Office in corresponding Japanese Patent Application No. 2013-191313 and English translation (10 pages).

*Primary Examiner* — Marcellus Augustin
(74) *Attorney, Agent, or Firm* — Buchanan Ingersoll & Rooney PC

(57) ABSTRACT

A network system is provided which includes an image forming apparatus having a plurality of addresses for communication; and a terminal used to operate the image forming apparatus from a remote location. The image forming apparatus includes a generating portion configured to generate a code indicating the addresses and priority orders of the addresses, and an output portion configured to output the code generated. The terminal includes a reader configured to obtain the code outputted, and a transmission processing portion configured to perform transmission processing for sending data to the image forming apparatus by using, based on the code obtained, the addresses in order from an address which is given the priority order higher than any other of the priority orders.

15 Claims, 21 Drawing Sheets

(56) References Cited

FOREIGN PATENT DOCUMENTS

| JP | 2005-349617 A | 12/2005 |
| JP | 2007-034443 A | 2/2007 |
| JP | 2007-311855 A | 11/2007 |
| JP | 2009-015716 A | 1/2009 |
| JP | 2010-157798 A | 7/2010 |

* cited by examiner

FIG. 10A

```
"1","IPv4 ADDRESS","192.168.2.2"
"2","Ipv6 ADDRESS","1234:3456:2345:1234"
"3","DNS NAME","abc.example.com"
"4","MAC ADDRESS","aa:bb:cc:dd:ee:ff"
"5","E-mail ADDRESS","mfp1@example.com"
"6","HOST NAME","mfp1_at_2nd_floor"
"7","BD ADDRESS","aa:bb:cc:dd:ee:fe"
"8","PRIORITY ORDERS","4,1,2,6,3,7,5"
```

```
"IPv4 ADDRESS","192.168.2.2"
"Ipv6 ADDRESS","1234:3456:2345:1234"
"HOST NAME","mfp1_at_2nd_floor"
"DNS NAME","abc.example.com"
"MAC ADDRESS","aa:bb:cc:dd:ee:ff"
"BD ADDRESS","aa:bb:cc:dd:ee:fe"
"E-mail ADDRESS","mfp1@example.com"
```

PLEASE SELECT A FORMAT OF INFORMATION REPRESENTED
IN A TWO-DIMENSIONAL BARCODE.

◉ FIRST FORMAT (WITH PRIORITY ORDERS)

○ SECOND FORMAT (PRIORITY ORDERS = LISTED ORDERS)

OK

51

NETWORK SYSTEM, CODE PROVIDING DEVICE, TERMINAL, AND COMPUTER-READABLE STORAGE MEDIUM FOR COMPUTER PROGRAM

This application is based on Japanese patent application No. 2013-191313 filed on Sep. 17, 2013, the contents of which are hereby incorporated by reference.

BACKGROUND OF THE INVENTION

1. Field of the Invention

The present invention relates to a technology for communication between an image forming apparatus and a terminal, and so on.

2. Description of the Related Art

Recent years have seen the widespread use of an image forming apparatus into which functions such as copying, faxing, and scanning are consolidated. The image forming apparatus is provided with a communication device such as a Network Interface Card (NIC). This enables a user to remotely control the image forming apparatus to execute a job by operating a terminal. To that end, it is necessary to register, in advance, an address of the image forming apparatus in the terminal.

In order to facilitate such address registration by a user, the following method has been proposed. An image forming apparatus displays a two-dimensional code obtained by converting address information of the image forming apparatus. A user photographs a displayed two-dimensional code by a photographing means of a portable terminal. The photographed two-dimensional code is automatically converted into address information, and the converted address is accessed from the portable terminal, and a job is transmitted (Japanese Laid-open Patent Publication No. 2007-34443).

In the meantime, recent image forming apparatuses are adaptable to a variety of communication methods. Such image forming apparatuses are given different addresses depending on communication methods. Examples of the addresses are an IP address for Internet Protocol version 4 (IPv4), an IP address for Internet Protocol version 6 (IPv6), a MAC address, a DNS name, a host name, a Bluetooth (registered trademark) Device (BD) address, and an electronic mail address.

In using such an image forming apparatus remotely, it is difficult for a user to determine which of the addresses is to be used to give a command to the image forming apparatus.

SUMMARY

The present invention has been achieved in light of such an issue, and an object thereof is to enable a user to remotely use an image forming apparatus given a plurality of addresses more easily than is conventionally possible.

According to one aspect of the present invention, a network system is provided which includes an image forming apparatus having a plurality of addresses for communication; and a terminal used to operate the image forming apparatus from a remote location. The image forming apparatus includes a generating portion configured to generate a code indicating the addresses and priority orders of the addresses, and an output portion configured to output the code generated. The terminal includes a reader configured to obtain the code outputted, and a transmission processing portion configured to perform transmission processing for sending data to the image forming apparatus by using, based on the code obtained, the addresses in order from an address which is given the priority order higher than any other of the priority orders.

These and other characteristics and objects of the present invention will become more apparent by the following descriptions of preferred embodiments with reference to drawings.

BRIEF DESCRIPTION OF THE DRAWINGS

FIGS. 10A and 10B are diagrams showing examples of a priorities-assigned character string.

FIG. 11 is a diagram showing an example of a format selection screen.

DESCRIPTION OF THE PREFERRED EMBODIMENTS

Figure 1:
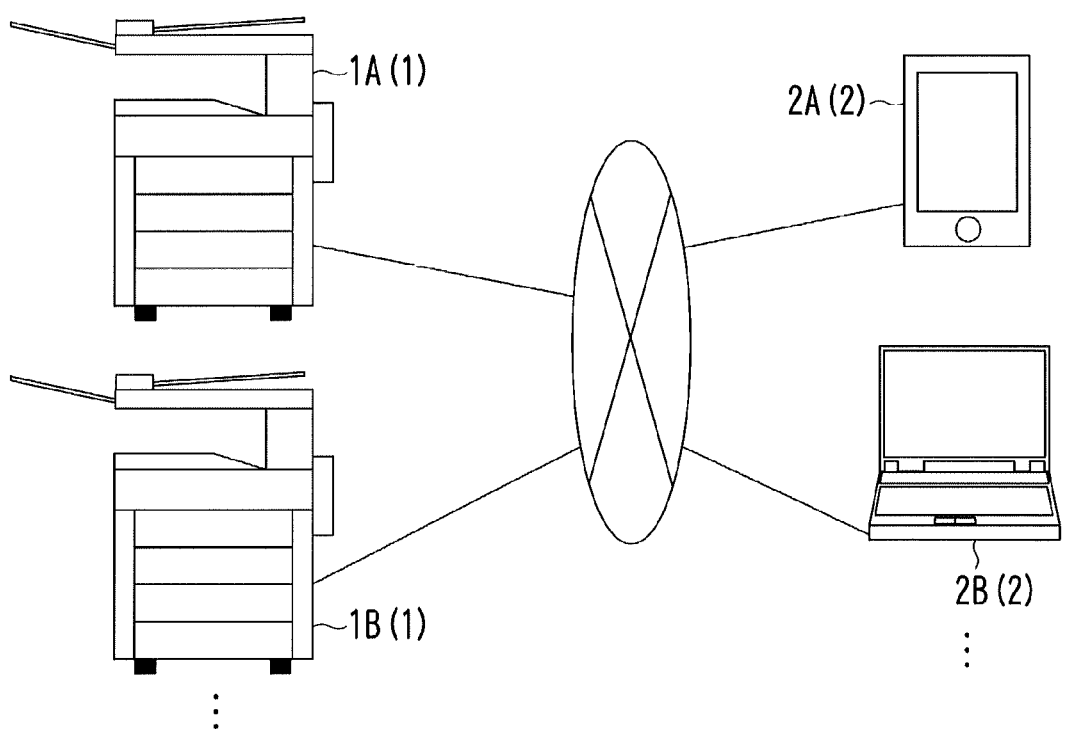
FIG. 1 is a diagram showing an example of the overall configuration of a network system.
Figure 2:
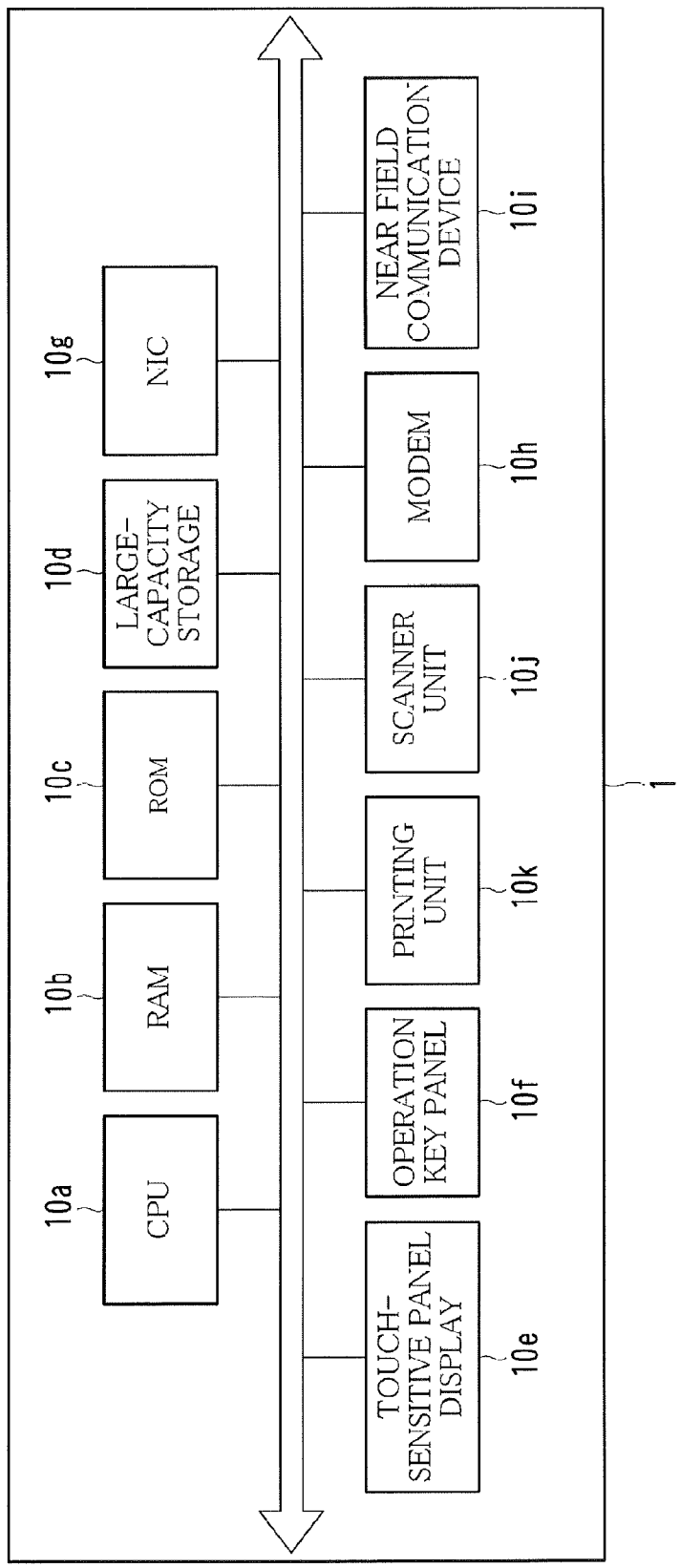
FIG. 2 is a diagram showing an example of the hardware configuration of an image forming apparatus.
Figure 3:
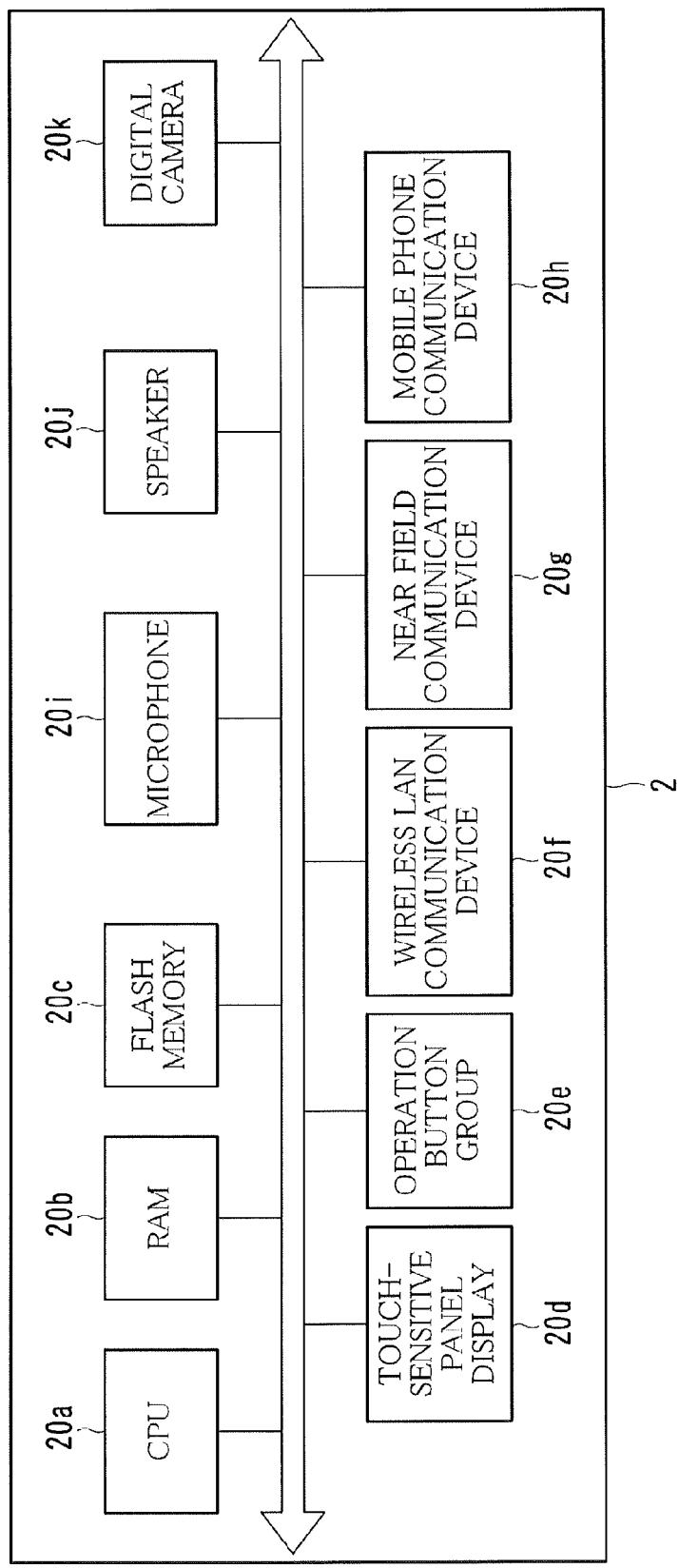
FIG. 3 is a diagram showing an example of the hardware configuration of a terminal.

FIG. 1 is a diagram showing an example of the overall configuration of a network system 3. FIG. 2 is a diagram showing an example of the hardware configuration of an image forming apparatus 1. FIG. 3 is a diagram showing an example of the hardware configuration of a terminal 2.

Referring to FIG. 1, the network system 3 is configured of a plurality of the image forming apparatuses 1, a plurality of the terminals 2, and so on. Hereinafter, the image forming apparatuses 1 are sometimes referred to as an "image forming apparatus 1A", "image forming apparatus 1B", . . . , and so on to distinguish one from another. Likewise, the terminals 2 are sometimes referred to as a "terminal 2A", "terminal 2B", . . . , and so on to distinguish one from another.

The image forming apparatus 1 is an apparatus into which functions such as copying, PC printing, faxing, and scanning, are consolidated. The image forming apparatus 1 is usually called a "multifunction device" or a "Multi-Functional Peripheral (MFP)".

The PC printing function is to print an image onto paper based on image data received from the terminal 2 which is on the same segment as the image forming apparatus 1. The PC printing function is sometimes called "network printing" or "network print".

Some image forming apparatuses 1 are also equipped with a function for e-mail print or a function for cloud print.

The e-mail print function is to receive an e-mail message to which image data is attached to print an image onto paper based on the attached image data. The cloud print function is to receive image data from the terminal 2 via the Internet to print an image onto paper. The cloud print function is sometimes called "cloud printing" or "mobile print".

Referring to FIG. 2, the image forming apparatus 1 is configured of a Central Processing Unit (CPU) 10$a$, a Random Access Memory (RAM) 10$b$, a Read Only Memory (ROM) 10$c$, a large-capacity storage 10$d$, a touch-sensitive panel display 10$e$, an operation key panel 10$f$, a Network Interface Card (NIC) 10$g$, a modem 10$h$, a near field communication device 10$i$, a scanner unit 10$j$, a printing unit 10$k$, and so on.

The touch-sensitive panel display 10$e$ displays, for example, a screen for presenting messages to a user, a screen for allowing the user to input commands or information, a screen for showing the results of processing executed by the CPU 10$a$, and so on. The touch-sensitive panel display 10$e$ sends a signal indicating a touched position to the CPU 10$a$.

The operation key panel 10$f$ is a so-called hardware keyboard, and is provided with a numeric keypad, a start key, a stop key, and a function key.

The NIC 10$g$ performs communication with other devices in accordance with a protocol such as Transmission Control Protocol/Internet Protocol (TCP/IP).

The modem 10$h$ sends and receives image data with a facsimile terminal in accordance with a protocol such as G3.

The near field communication device 10$i$ performs communication based on the standard for near field communication. In this embodiment, a Bluetooth-ready device is used.

The scanner unit 10$j$ optically reads an image recorded on a sheet of paper placed on a platen glass to generate image data thereof.

The printing unit 10$k$ prints, onto paper, an image captured by the scanner unit 10$j$ and an image received from other devices by the NIC 10$g$, the modem 10$h$, or the near field communication device 10$i$.

The ROM 10$c$ or the large-capacity storage 10$d$ stores, therein, software for implementing the foregoing functions such as copying. The ROM 10$c$ or the large-capacity storage 10$d$ also stores a server program 10P1 therein. The server program 10P1 is to provide a service which allows the terminal 2 to get access to the image forming apparatus 1 easily.

The programs are loaded into the RAM 10$b$ as necessary and executed by the CPU 10$a$. Examples of the large-capacity storage 10$d$ are a hard disk or a Solid State Drive (SSD).

Some of the image forming apparatuses 1 are provided with all of the NIC 10$g$, the modem 10$h$, and the near field communication device 10$i$. Some of the image forming apparatuses 1 are provided with only one or two of the NIC 10$g$, the modem 10$h$, and the near field communication device 10$i$.

Further, the network conditions are different among the image forming apparatuses 1. Some of the image forming apparatuses 1 are given both an IP address for IP version 4 (IPv4) and an IP address for IP version 6 (IPv6). Some of the image forming apparatuses 1 are given only one thereof. Further, some of the image forming apparatuses 1 are dynamically given an IP address for IPv4 in accordance with a Dynamic Host Configuration Protocol (DHCP). Some of the image forming apparatuses 1 are given a fixed address. Moreover, some of the image forming apparatuses 1 are given both a Domain Name System (DNS) name and a host name. Some of the image forming apparatuses 1 are given only one of the names. Some of the image forming apparatuses 1 are given neither the DNS name nor the host name.

Referring back to FIG. 1, the terminal 2 is a client of the image forming apparatus 1. The user operates the terminal 2 to use the foregoing functions of the image forming apparatus 1 from remote locations. The terminal 2 may be a laptop computer, a smartphone, or a tablet computer. The terminal 2 may be a desktop computer; however, a registration program 20P1 described later is suitably used, particularly, in a portable computer. Hereinafter, an example is described in which the terminal 2 is a tablet computer.

Referring to FIG. 3, the terminal 2 is configured of a CPU 20$a$, a RAM 20$b$, a flash memory 20$c$, a touch-sensitive panel display 20$d$, an operation button group 20$e$, a wireless Local Area Network (LAN) communication device 20$f$, a near field communication device 20$g$, a mobile phone communication device 20$h$, a microphone 20$i$, a speaker 20$j$, a digital camera 20$k$, and so on.

The touch-sensitive panel display 20$d$ displays, for example, a screen for presenting messages to the user, a screen for showing the results of processing, a screen for allowing the user to input commands, and so on. The touch-sensitive panel display 20$d$ detects a touched position and informs the CPU 20$a$ of the touched position.

The operation button group 20$e$ includes a button for returning to the Start screen, a button for controlling (sound) volume, and a button for switching between ON and OFF of the power supply.

The wireless LAN communication device 20$f$ performs communication based on the standard for wireless LAN, specifically, the standard for Institute of Electrical and Electronics Engineers (IEEE) 802.11.

The near field communication device 20$g$ performs communication based on the same standard as that for the near field communication device 10$i$ of the image forming apparatus 1. In this embodiment, therefore, the near field communication device 20$g$ performs communication based on the standard for Bluetooth.

The mobile phone communication device 20$h$ performs communication based on the standard for Code Division Multiple Access (CDMA) 2000, Wideband-CDMA (W-CDMA), Long Term Evolution (LTE), or the like through a so-called mobile phone network.

The microphone 20$i$ collects sound to generate audio data. The speaker 20$j$ outputs sound based on the audio data. The digital camera 20$k$ takes an image to generate image data. The digital camera 20$k$ is also capable of recording a moving image to generate image data of the moving image.

The flash memory 20c stores therein application programs for a document preparation application (word processing software, for example), a mailer, a web browser, and a scheduler. The flash memory 20c also stores the registration program 20P1 therein. The registration program 20P1 is a program for registering, in the terminal 2 itself, information necessary for access to the image forming apparatus 1.

The programs are loaded into the RAM 20b as necessary and executed by the CPU 20a.

Some of the terminals 2 are provided with all of the wireless LAN communication device 20f, the near field communication device 20g, and the mobile phone communication device 20h. Some of the terminals 2 are provided with only one or two thereof.

Figure 4:
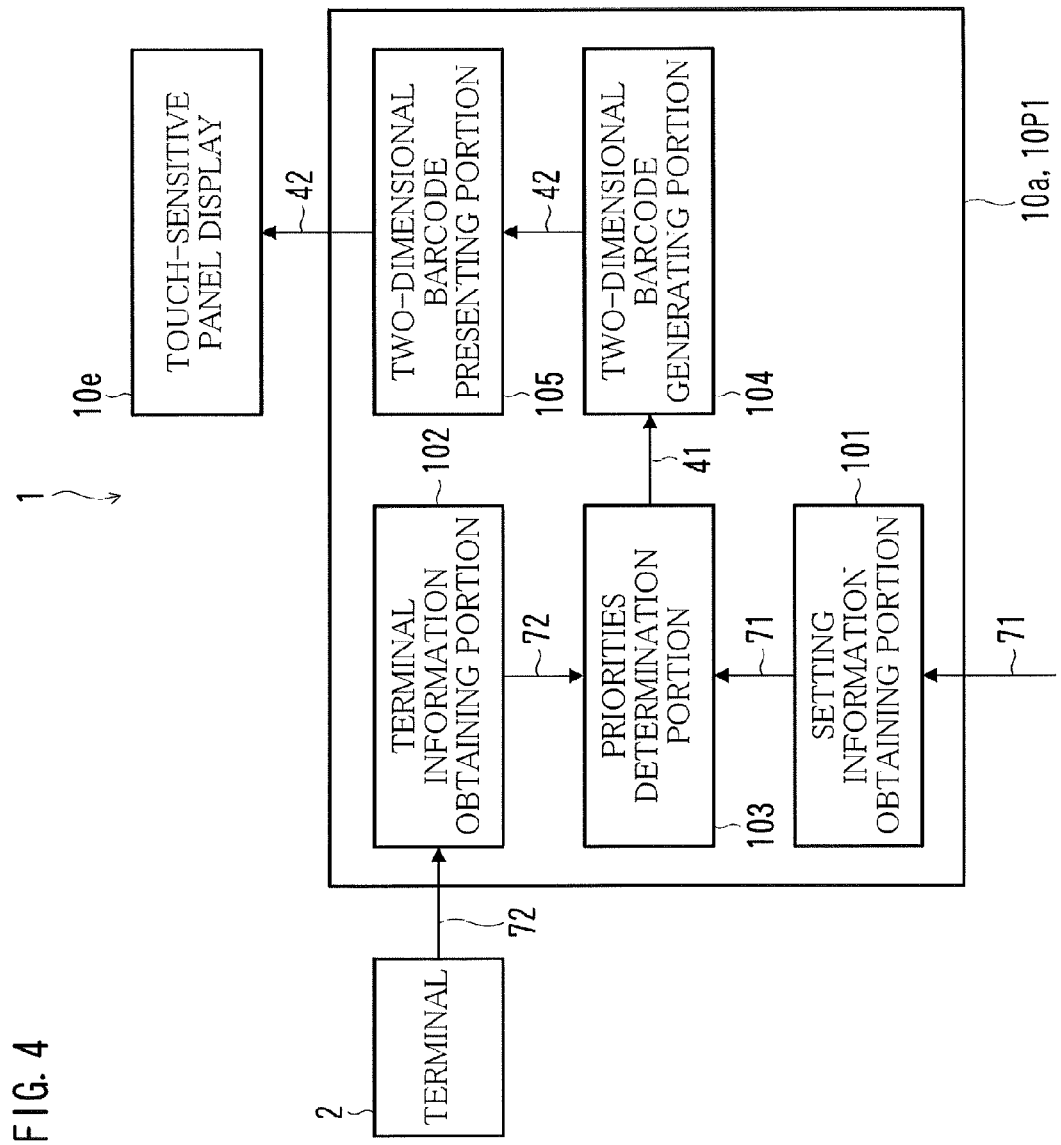
FIG. 4 is a diagram showing an example of the functional configuration of an image forming apparatus.
Figure 5:
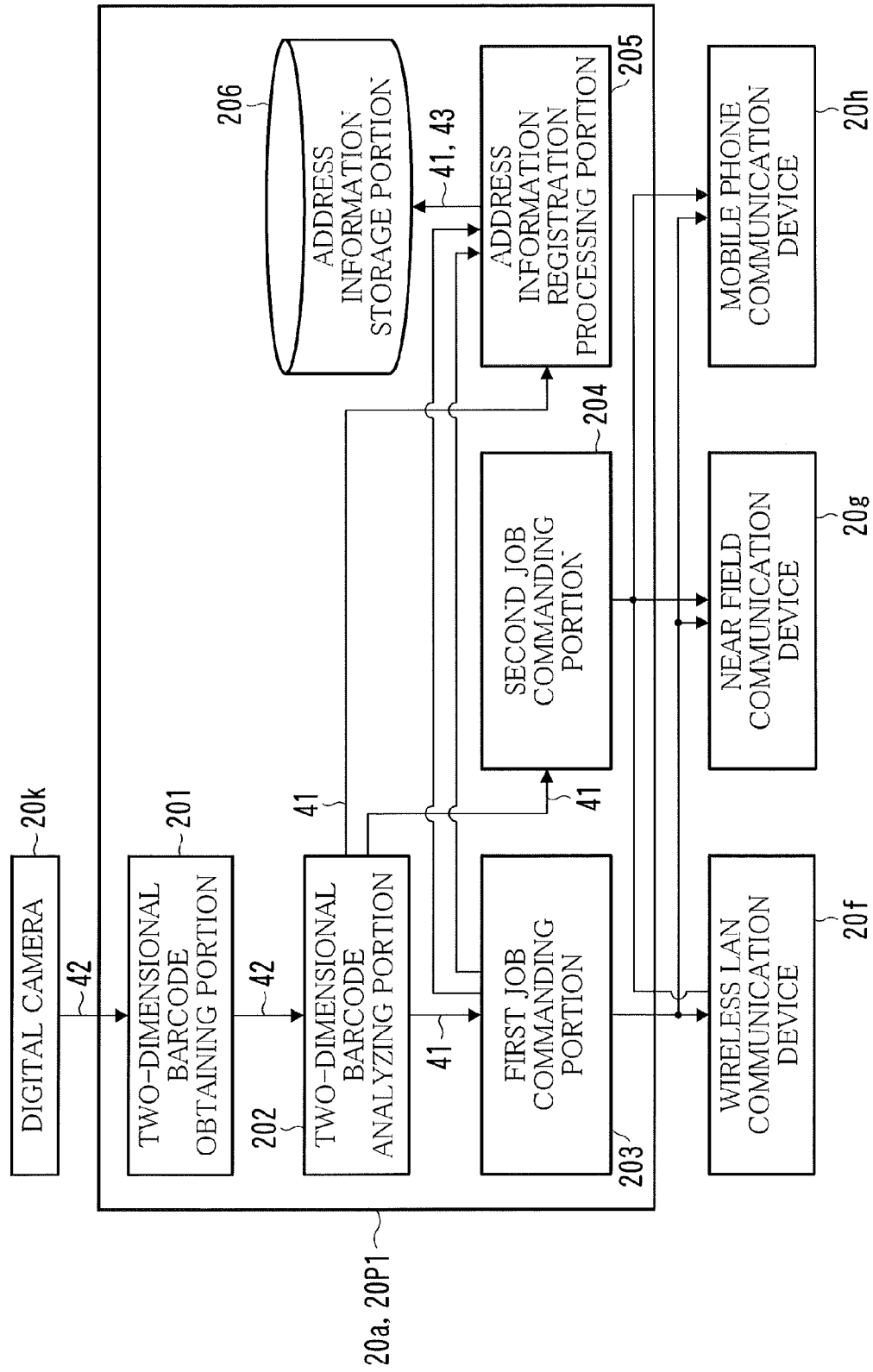
FIG. 5 is a diagram showing an example of the functional configuration of a terminal.
Figure 6:
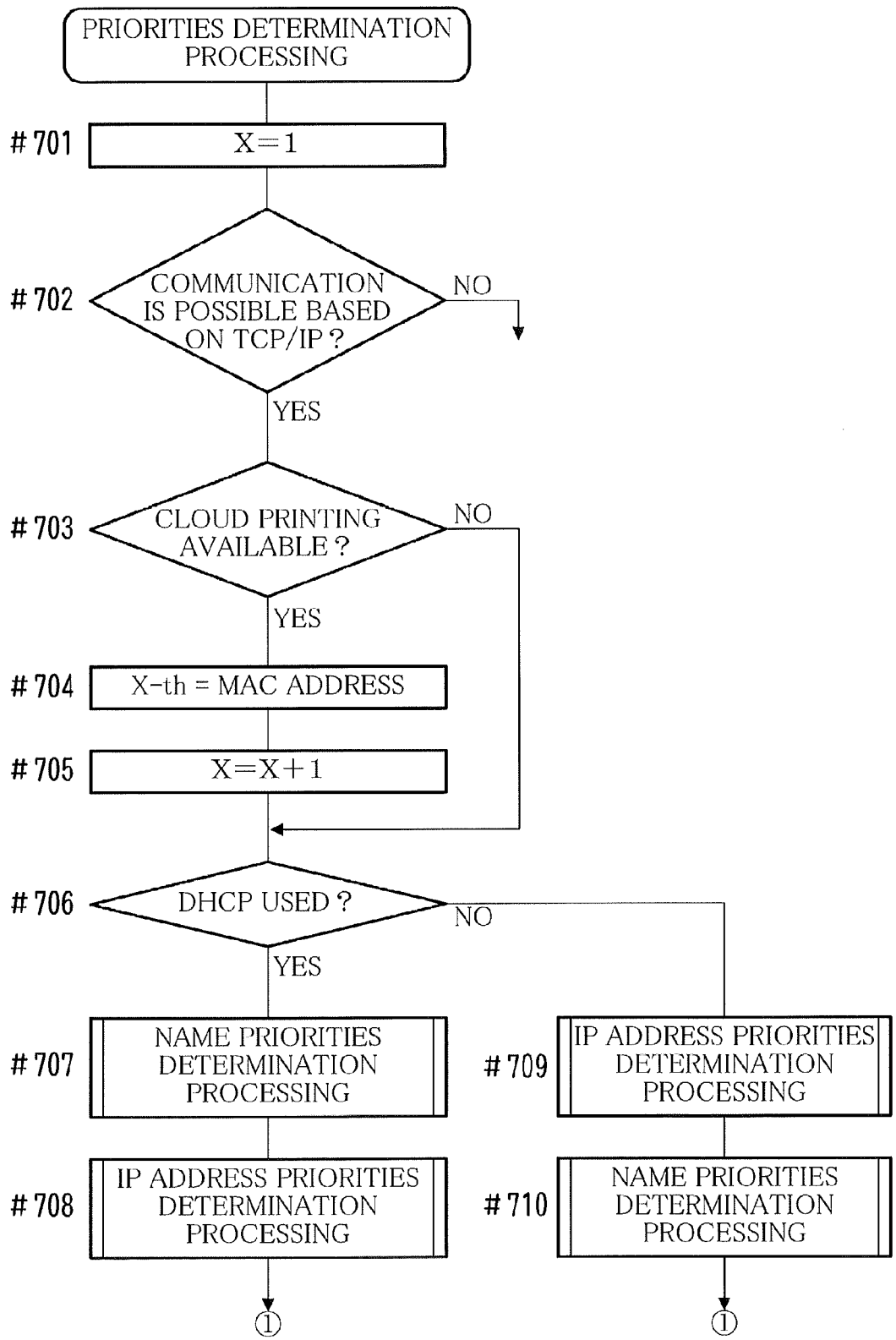
FIG. 6 is a flowchart depicting an example of the flow of priorities determination processing.
Figure 7:
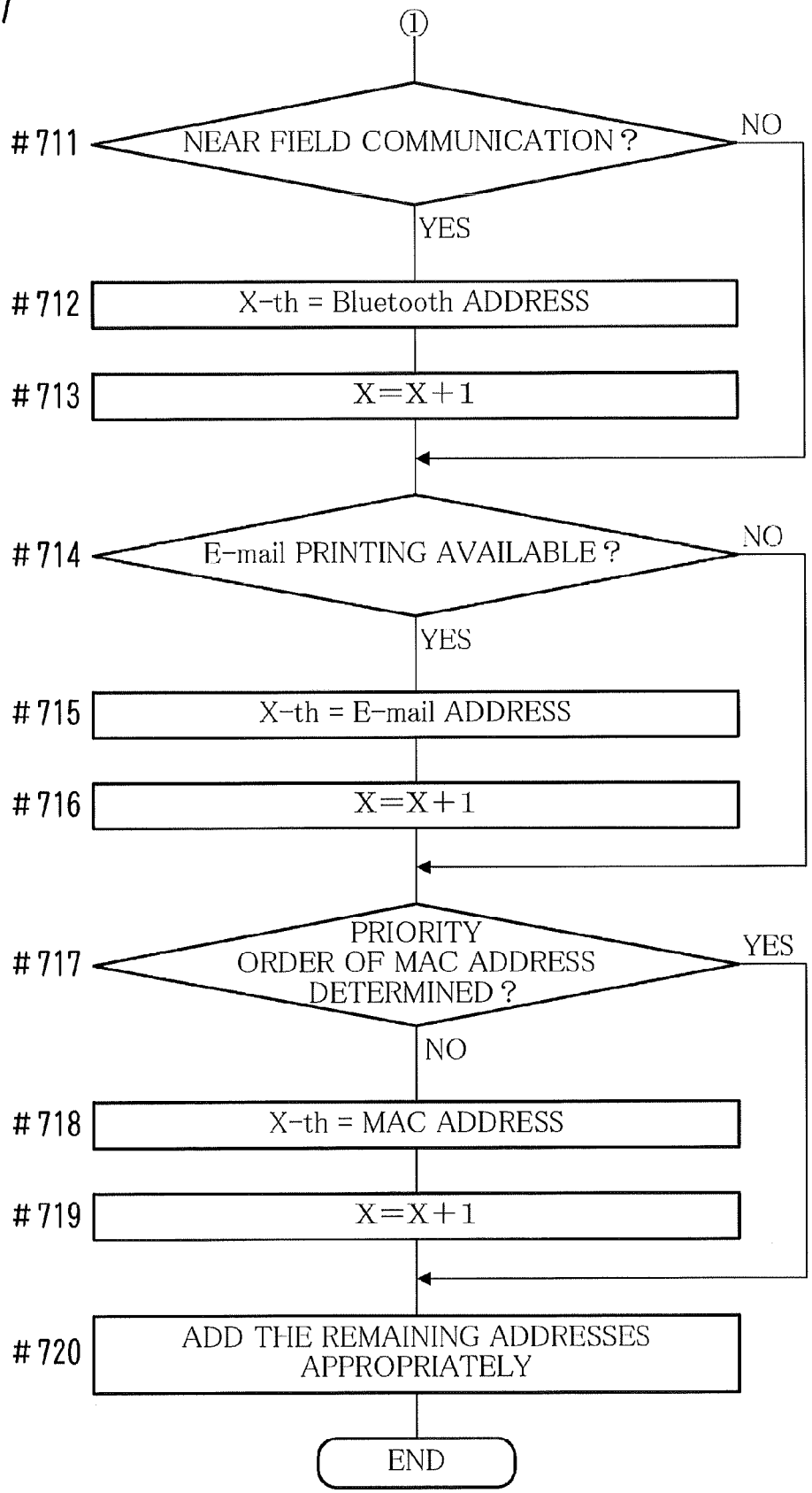
FIG. 7 is a flowchart depicting an example of the flow of priorities determination processing.
Figure 8:
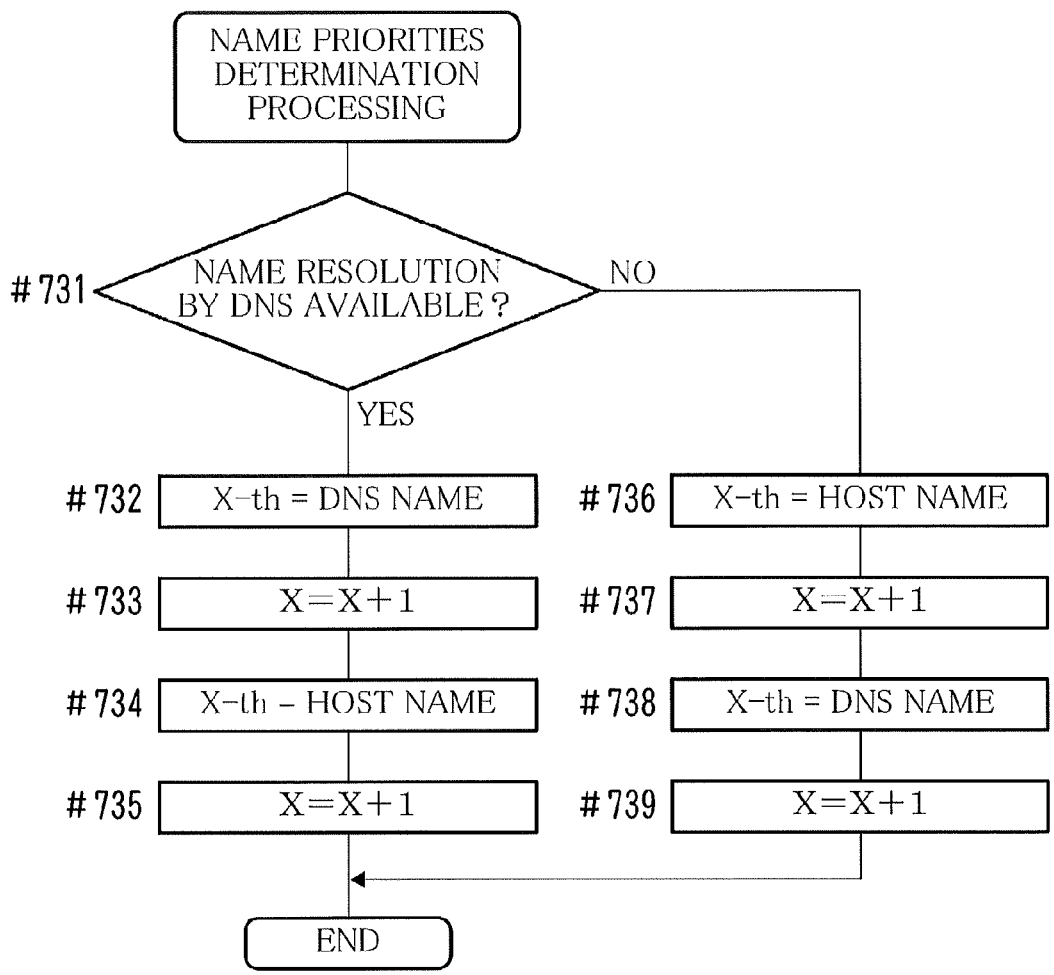
FIG. 8 is a flowchart depicting an example of the flow of name priorities determination processing.
Figure 9:
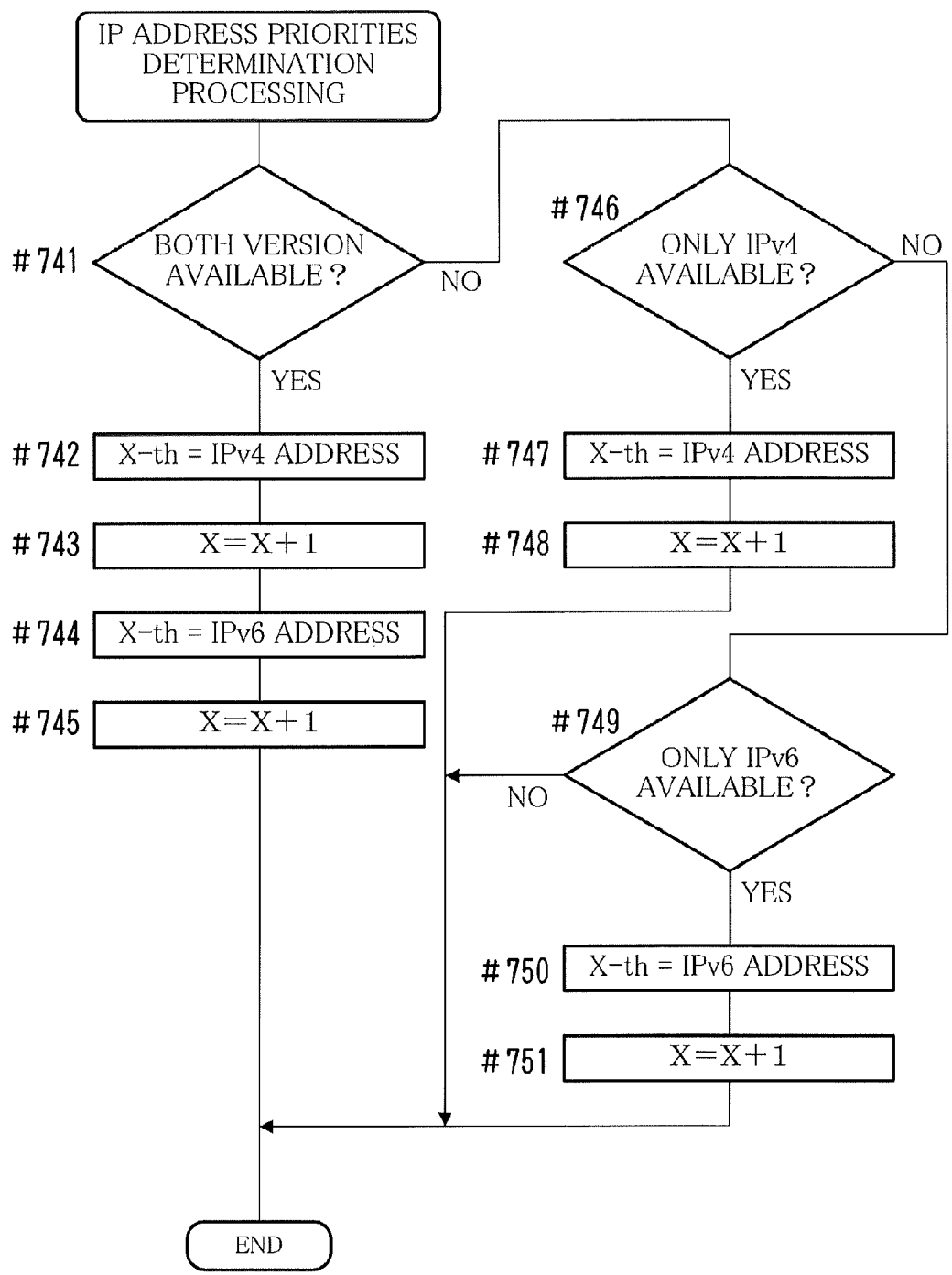
FIG. 9 is a flowchart depicting an example of the flow of IP address priorities determination processing.
Figure 12:
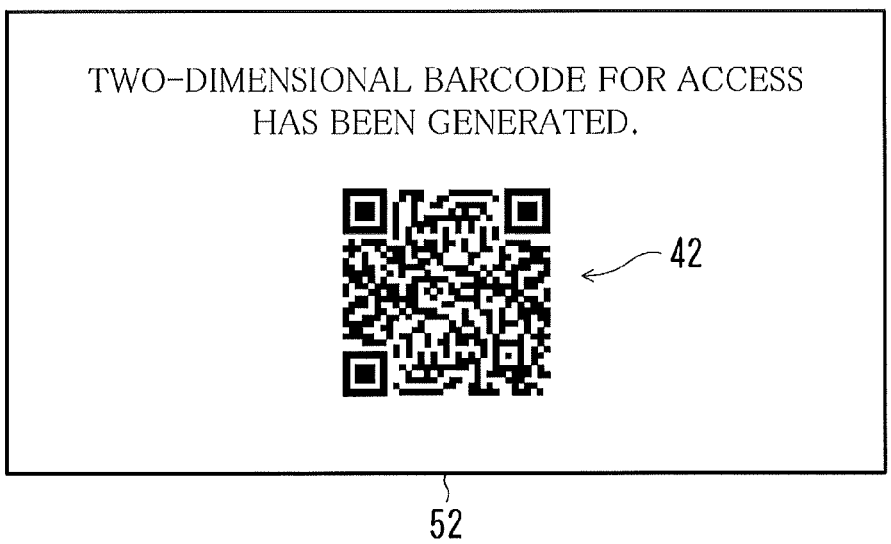
FIG. 12 is a diagram showing an example of a two-dimensional barcode screen.
Figure 13:
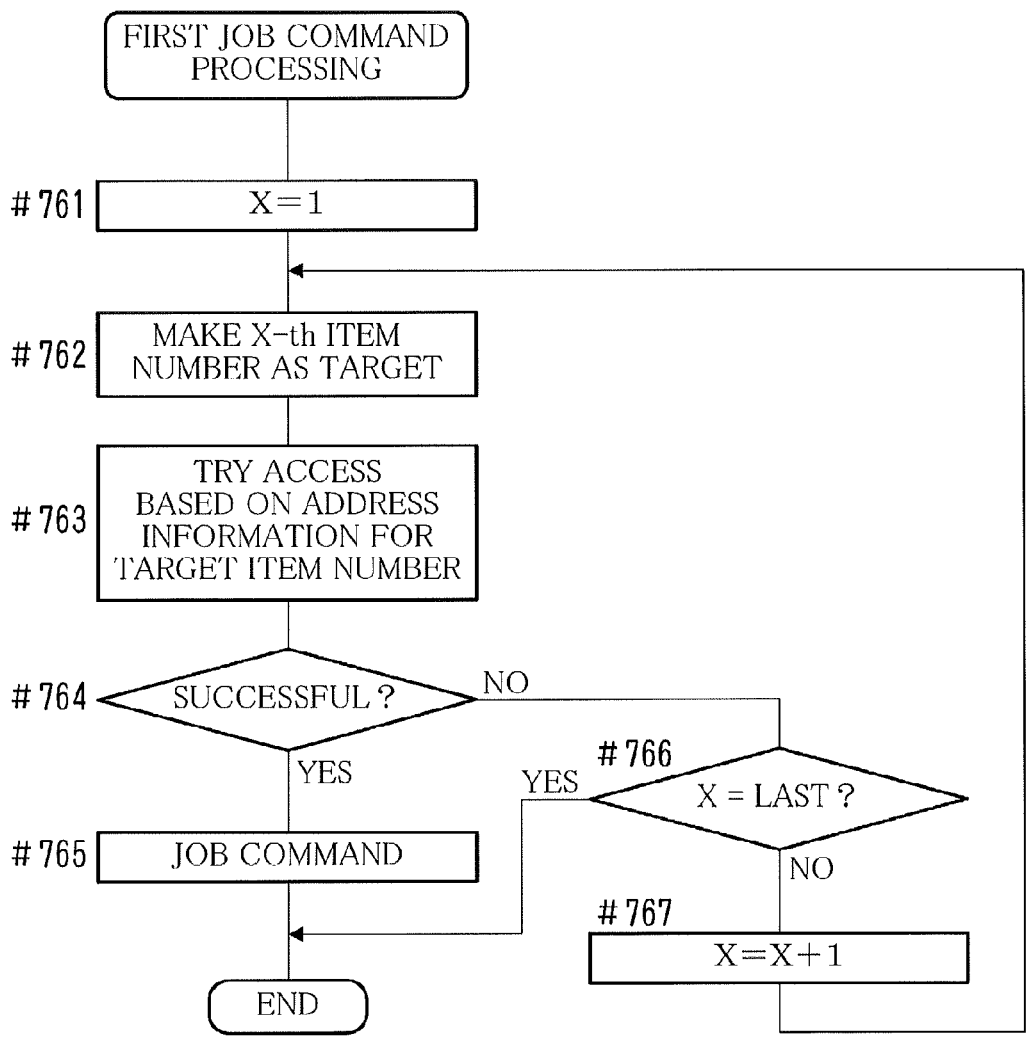
FIG. 13 is a flowchart depicting an example of the flow of first job command processing.
Figure 14:
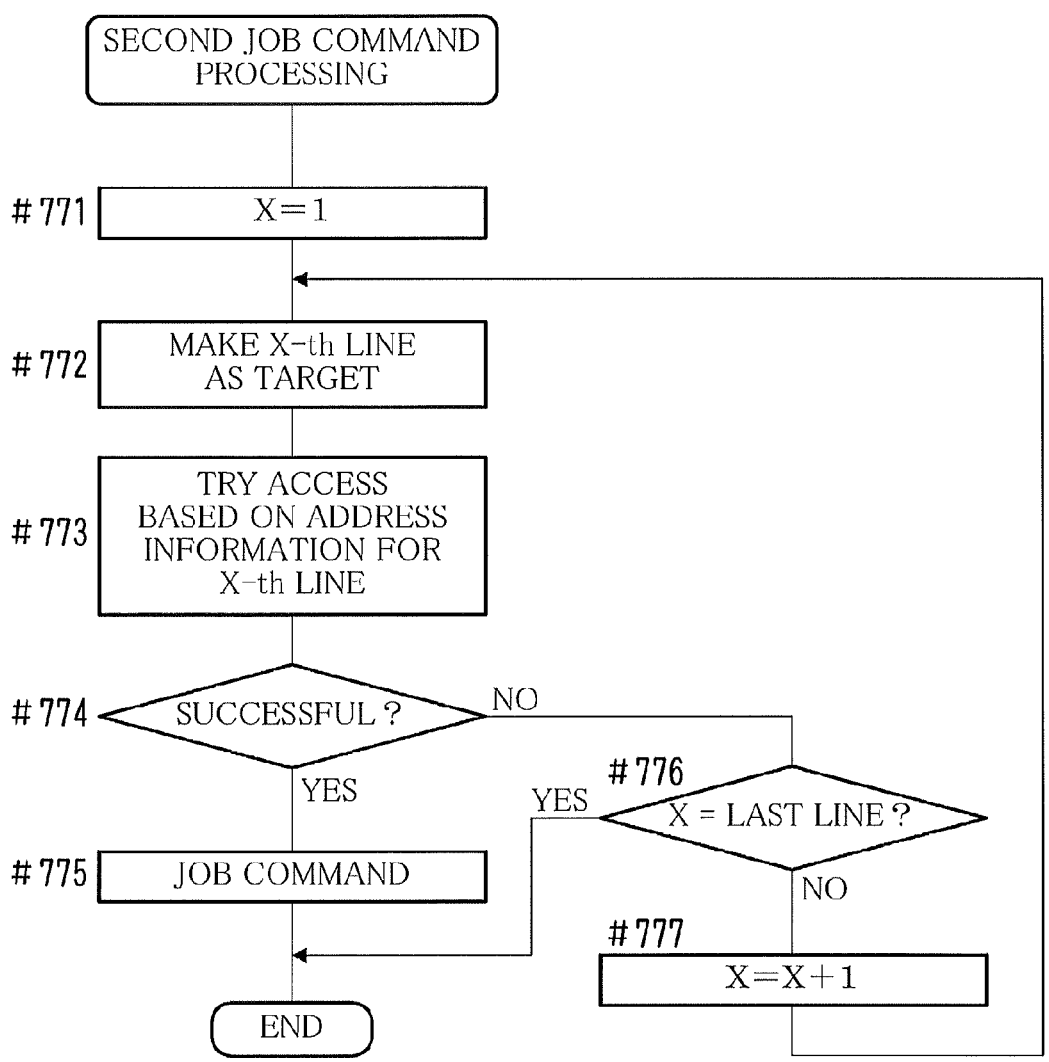
FIG. 14 is a flowchart depicting an example of the flow of second job command processing.

FIG. 4 is a diagram showing an example of the functional configuration of the image forming apparatus 1. FIG. 5 is a diagram showing an example of the functional configuration of the terminal 2. FIGS. 6 and 7 are flowcharts depicting an example of the flow of priorities determination processing. FIG. 8 is a flowchart depicting an example of the flow of name priorities determination processing. FIG. 9 is a flowchart depicting an example of the flow of IP address priorities determination processing. FIGS. 10A and 10B are diagrams showing examples of a priorities-assigned character string 41. FIG. 11 is a diagram showing an example of a format selection screen 51. FIG. 12 is a diagram showing an example of a two-dimensional barcode screen 52. FIG. 13 is a flowchart depicting an example of the flow of first job command processing. FIG. 14 is a flowchart depicting an example of the flow of second job command processing.

The description goes on to the functions that the server program 10P1 implements in the image forming apparatus 1 and the functions that the registration program 20P1 implements in the terminal 2 with reference to FIGS. 4, 5, and so on.

The server program 10P1 implements the functions of a setting information obtaining portion 101, a terminal information obtaining portion 102, a priorities determination portion 103, a two-dimensional barcode generating portion 104, a two-dimensional barcode presenting portion 105, and so on, all of which are shown in FIG. 4.

The registration program 20P1 implements the functions of a two-dimensional barcode obtaining portion 201, a two-dimensional barcode analyzing portion 202, a first job commanding portion 203, a second job commanding portion 204, an address information registration processing portion 205, and an address information storage portion 206, and so on, all of which are shown in FIG. 5.

Hereinafter, the processing by the portions shown in FIGS. 4 and 5 is described by taking an example in which the terminal 2A registers the address of the image forming apparatus 1A to cause the image forming apparatus 1A to execute a job. Along with this, operation by the user is also described.

The user goes to the installation site of the image forming apparatus 1A and operates the touch-sensitive panel display 10e or the operation key panel 10f thereof to enter a predetermined command.

In response to this operation, the setting information obtaining portion 101 of the image forming apparatus 1A obtains information on settings for network made in the image forming apparatus 1A itself by making an inquiry to an Operating System (OS) or the like. Hereinafter, the information is referred to as "subject device information 71".

The subject device information 71 indicates values of addresses for identifying the subject image forming apparatus 1A in various communication methods. Examples of the addresses are a Media Access Control (MAC) address, an IP address for IPv4, an IP address for IPv6, a DNS name, a host name, an electronic mail (E-Mail) address, and a Bluetooth Device (BD) address. The subject device information 71 also indicates the effectiveness of the function to obtain an IP address from the DHCP server, the effectiveness of the e-mail print function, the effectiveness of the cloud print function, and so on.

The terminal information obtaining portion 102 obtains network-related information on the terminal 2 which is to get access to the image forming apparatus 1A (terminal 2A in this example). Hereinafter, such information is referred to as "terminal information 72".

The terminal information 72 indicates whether or not communication through each of IPv4, IPv6, e-mail, and Bluetooth is possible, and indicates whether or not the cloud print function can be used.

The terminal information obtaining portion 102 obtains the terminal information 72 in the following manner. For example, when each of the image forming apparatus 1A and the terminal 2A is provided with a Universal Serial Bus (USB) port, it is preferable to obtain the terminal information 72 by copying the terminal information 72 from the terminal 2A to the USB memory and reading out the terminal information 72 from the USB memory. Alternatively, when each of the image forming apparatus 1A and the terminal 2A is provided with a device for infrared communication, it is preferable to obtain the terminal information 72 from the terminal 2A in a similar way to that of exchanging telephone numbers or the like between mobile phone terminals. Yet alternatively, it is possible to obtain the terminal information 72 by displaying a dialogue box for inquiry on the touch-sensitive panel display 10e and prompting the user to reply to the inquiry.

When the subject device information 71 and the terminal information 72 are obtained, the priorities determination portion 103 determines, based on the pieces of information and predetermined rules, priorities of addresses of the image forming apparatus 1A which are used by the terminal 2A to access to the image forming apparatus 1A. It is preferable that the rules are determined appropriately in accordance with the security policy or the preference of the user. Hereinafter, an example is described in which the following Rule_1 through Rule_5 are set mainly.

(Rule_1) The MAC address is given the highest priority provided that the cloud print function of the image forming apparatus 1A is enabled, and that the terminal 2A uses the cloud print function.

(Rule_2) An address related to name (DNS name and host name) takes precedence over an address related to IP address (IP address for IPv4 and IP address for IPv6) provided that the image forming apparatus 1A is given an IP address based on the DHCP.

(Rule_3) The IP address for IPv4 takes precedence over the IP address for IPv6 provided that the image forming apparatus 1A and the terminal 2A are configured to perform both communication based on IPv4 and communication based on IPv6.

(Rule_4) The DNS name takes precedence over the host name provided that the terminal 2A is capable of getting access to the image forming apparatus 1A based on name resolution by the DNS from outside the segment on which the image forming apparatus 1A is located.

(Rule_5) Addresses of which priority orders are not determined based on the Rule-1 through Rule-4, but which can be used to get access to the image forming apparatus 1A from the terminal 2A are given lower priorities.

The description goes on to an example of the steps for determining the priorities based on the rules with reference to the flowcharts of FIGS. 6-9.

When the image forming apparatus 1A and the terminal 2A are capable of performing communication with each other based on the TCP/IP (Yes in Step #702 of FIG. 6), the priorities determination portion 103 determines the priority orders of the MAC address, the IP address for IPv4, the IP address for IPv6, the DNS name, and the host name of the image forming apparatus 1A in the following manner (Step #703-Step #710). Whether or not the communication is possible is determined based on the subject device information 71 and the terminal information 72. For example, if the subject device information 71 indicates at least one of the IP address for IPv4, the IP address for IPv6, the DNS name, and the host name, and further, if the terminal information 72 indicates that communication based on IPv4, IPv6, or e-mail is possible, then it turns out that the communication based on the TCP/IP is possible. Otherwise, it is determined that the communication based on the TCP/IP is impossible.

If the subject device information 71 shows that the cloud print function is enabled (Yes in Step #703 of FIG. 6), then the priorities determination portion 103 determines to assign the highest priority to the MAC address of the image forming apparatus 1A (Step #704 and Step #705).

If the subject device information 71 indicates that the function to obtain the IP address from a DHCP server is enabled (Yes in Step #706), then the priorities determination portion 103 performs the name priorities determination processing to determine the priority orders of the DNS name and the host name (Step #707), and then, the priorities determination portion 103 performs the IP address priorities determination processing to determine the priority orders of the IP address for IPv4 and the IP address for IPv6 (Step #708).

The steps for the name priorities determination processing are shown in FIG. 8. To be specific, the priorities determination portion 103 determines the priorities in the manner as described below depending on whether or not the terminal 2A can get access to the image forming apparatus 1A based on the name resolution by the DNS.

If the terminal 2A can get access to the image forming apparatus 1A based on the name resolution by the DNS (Yes in Step #731 of FIG. 8), then the priorities determination portion 103 determines the priority order of the DNS name of the image forming apparatus 1A to be an order immediately after the address of which the priority order has been determined to be lowest (Step #732 and Step #733). The priorities determination portion 103 then determines the priority order of the host name of the image forming apparatus 1A to be an order next to the priority order of the DNS name (Step #734 and Step #735).

On the other hand, if the terminal 2A cannot get access to the image forming apparatus 1A based on the name resolution by the DNS (No in Step #731), then the priorities determination portion 103 determines the priority order of the host name of the image forming apparatus 1A to be an order immediately after the address of which the priority order has been determined to be lowest (Step #736 and Step #737). The priorities determination portion 103 then determines the priority order of the DNS name of the image forming apparatus 1A to be an order next to the priority order of the host name (Step #738 and Step #739). The DNS name is given the priority order as described above because consideration is made to a case where access based on the name resolution by the DNS becomes probably possible in the future. Alternatively, it is also possible not to give the priority order to the DNS name without making such consideration. In other words, the processing may bypass Step #738 and Step #739.

The steps for the IP address priorities determination processing are shown in FIG. 9. To be specific, if the communication based on the IPv4 is possible between the image forming apparatus 1A and the terminal 2A, and further, if the communication based on the IPv6 is possible between the image forming apparatus 1A and the terminal 2A (Yes in Step #741 of FIG. 9), then the priorities determination portion 103 determines the priority order of the IP address for IPv4 of the image forming apparatus 1A to be an order immediately after the address of which the priority order has been determined to be lowest (Step #742 and Step #743). The priorities determination portion 103 then determines the priority order of the IP address for IPv6 of the image forming apparatus 1A to be an order next to the priority order of the IP address for IPv4 of the image forming apparatus 1A (Step #744 and Step #745). According to the processing, for example, if the priority orders of the three addresses of the MAC address, the DNS name, and the host name are determined, then the priority order of the IP address for IPv4 is determined to be "4", and the priority order of the IP address for IPv6 is determined to be "5".

If the communication based on the IPv4 is only possible between the image forming apparatus 1A and the terminal 2A (No in Step #741 and Yes in Step #746), then the priorities determination portion 103 determines the priority order of the IP address for IPv4 of the image forming apparatus 1A to be an order immediately after the address of which the priority order has been determined to be lowest (Step #747 and Step #748). Alternatively, if the communication based on the IPv6 is only possible between the image forming apparatus 1A and the terminal 2A (No in Step #741, No in Step #746, and Yes in Step #749), then the priorities determination portion 103 determines the priority order of the IP address for IPv6 of the image forming apparatus 1A to be an order immediately after the address of which the priority order has been determined to be lowest (Step #750 and Step #751).

As with the case of the DNS name described earlier with reference to FIG. 8, in light of the applicability in the future, even if the communication based on the IPv4 is impossible, it is possible to determine the priority order of the IP address for IPv4 to be an order next to the priority order of the IP address for IPv6. Likewise, it is possible to determine the IP address for IPv6 to be an order next to the priority order of the IP address for IPv4.

Yet alternatively, independent of whether or not an address can be used for communication between the image forming apparatus 1A and the terminal 2A, it is possible to determine the priorities based on whether or not each IP address is enabled in the image forming apparatus 1A. For example, when both the IP addresses for IPv4 and IPv6 are enabled, it is possible to determine that the former takes precedence over the latter. When one of the IP addresses for IPv4 and IPv6 is enabled, it is possible to place the priority on the enabled address, or, alternatively, it is possible not to place the priority on the disabled address.

Referring back to FIG. 6, if the subject device information 71 indicates that the function to obtain the IP address from the DHCP server is disabled (No in Step #706), then the priorities determination portion 103 first performs the IP address priorities determination processing shown in FIG. 9

(Step #709) and then performs the name priorities determination processing as shown in FIG. 8 (Step #710).

If the image forming apparatus 1A and the terminal 2A can perform communication with each other based on Bluetooth (Yes in Step #711 of FIG. 7), then the priorities determination portion 103 determines the priority order of the BD address for the image forming apparatus 1A to be an order immediately after the address of which the priority order has been determined to be lowest (Step #712 and Step #713). Whether or not the communication based on Bluetooth is possible may be determined based on the subject device information 71 and the terminal information 72. To be specific, if the subject device information 71 indicates the BD address, and further, if the terminal information 72 indicates that the use of Bluetooth is possible, then it is preferably determined that the communication is possible.

If the subject device information 71 indicates that e-mail print is enabled, and further, if the terminal information 72 indicates that e-mail can be used (Yes in Step #714), then the priorities determination portion 103 determines the priority order of the electronic mail address of the image forming apparatus 1A to be an order immediately after the address of which the priority order has been determined to be lowest (Step #715 and Step #716).

If the priority order of the MAC address of the image forming apparatus 1A has not yet been determined (No in Step #717), then the priorities determination portion 103 determines the priority order of the MAC address to be an order immediately after the address of which the priority order has been determined to be lowest (Step #718 and Step #719). Likewise, the priorities determination portion 103 gives priority orders, in a predetermined order, to other addresses of which the priority orders have not yet been determined (Step #720).

Whether or not to give a priority order to an address disabled in the image forming apparatus 1A and a priority order to an address unusable for communication with the terminal 2A is preferably determined in advance for each address. Priority orders may be given to some of the addresses, or, alternatively, no priority orders may be given to the addresses.

Referring back to FIG. 4, the two-dimensional barcode generating portion 104 generates a priorities-assigned character string 41 indicating the result determined by the priorities determination portion 103, and converts the priorities-assigned character string 41 into a two-dimensional barcode 42. The priorities-assigned character string 41 may be represented, for example, in the following two formats.

The first format is shown in FIG. 10A. To be specific, in the first format, types and values of the addresses of the image forming apparatus 1A are listed in a predetermined order, and item numbers in accordance with the listed order are given to the addresses. In the last item (line), a character string of item numbers is provided to show the addresses from one given a higher priority. Hereinafter, the character string is referred to as a "priorities record".

The second format is shown in FIG. 10B. To be specific, in the second format, types and values of the addresses of the image forming apparatus 1A are listed in order from the address given a highest priority. The second format does not contain the priorities record.

Which of the formats is to be used may be determined in advance for each image forming apparatus 1. Alternatively, a format selection screen 51 as shown in FIG. 11 may be displayed on the touch-sensitive panel display 10e to prompt the user to select one of the formats.

The format of the two-dimensional barcode 42 may be a known format. Hereinafter, an example is described in which the two-dimensional barcode 42 is a Quick Response (QR) code.

The two-dimensional barcode presenting portion 105 displays, on the touch-sensitive panel display 10e, the two-dimensional barcode screen 52 in which the two-dimensional barcode 42 generated by the two-dimensional barcode generating portion 104 is placed as shown in FIG. 12.

The user uses the digital camera 20k of the terminal 2A to take an image of the two-dimensional barcode 42.

When the image of the two-dimensional barcode 42 is taken, the individual portions of the terminal 2A shown in FIG. 5 perform the following processing.

The two-dimensional barcode obtaining portion 201 obtains image data of the two-dimensional barcode 42 from the digital camera 20k.

The two-dimensional barcode analyzing portion 202 analyzes the two-dimensional barcode 42 to calculate the priorities-assigned character string 41 represented by the two-dimensional barcode 42.

The address information registration processing portion 205 associates the priorities-assigned character string 41 calculated with the identifier of the image forming apparatus 1A (e.g., device name or installation location which are easy to understand for the user), and stores the resultant into the address information storage portion 206.

The user then prepares, in the terminal 2A, document data 73 on a document to be printed by creating a document with an application of the terminal 2A or downloading document data from a web site. Then, the user enters a print command. At this time, the user designates the image forming apparatus 1A as a print destination.

In response to this operation, the first job commanding portion 203 and the second job commanding portion 204 perform the following processing depending on the format of the priorities-assigned character string 41.

If the priorities-assigned character string 41 has the format shown in FIG. 10A, namely, the format having fields of item number, type, and value for each address, then the first job commanding portion 203 performs processing for gaining access to the image forming apparatus 1A according to the steps of FIG. 13.

The first job commanding portion 203 makes, as a target, the item number shown at the leftmost of the priorities record of the priorities-assigned character string 41 (Step #761 and Step #762 of FIG. 13). Based on the information (type and value) of the address corresponding to the target item number, the terminal 2A attempts to gain access to the image forming apparatus 1A (Step #763). If the priorities-assigned character string 41 shown in FIG. 10A is obtained, then the terminal 2A attempts to gain access to the device corresponding to the MAC address "aa:bb:cc:dd:ee:ff". This is because the leftmost item number in the priorities record is "4".

If the access is obtained successfully, i.e., if the terminal 2A can gain access to the image forming apparatus 1A (Yes in Step #764), then the first job commanding portion 203 instructs the image forming apparatus 1A to execute a print job by sending the document data 73 through the wireless LAN communication device 20f, the near field communication device 20g, or the mobile phone communication device 20h (Step #765).

If the access fails (No in Step #764), then the first job commanding portion 203 makes, as a target, the item number shown next in the priorities record of the priorities-assigned character string 41 (Step #767 and Step #762).

Then, based on the information (type and value) on an address corresponding to the target item number, the terminal 2A attempts to gain access to the image forming apparatus 1A (Step #763). However, if no more item numbers are left (Yes in Step #766), then the first job commanding portion 203 finishes the series of processing shown in FIG. 13.

As discussed above, the first job commanding portion 203 gives attention to the item numbers shown in the priorities record, one by one, from left to right, and attempts to obtain access to the image forming apparatus 1A based on the address information corresponding to the target item number until the terminal 2A gains access to the image forming apparatus 1A successfully.

On the other hand, if the priorities-assigned character string 41 does not contain the item numbers of addresses as shown in FIG. 10B, the second job commanding portion 204 makes, as a target, the top line of the priorities-assigned character string 41 (Step #771 and Step #772 of FIG. 14). Based on the information (type and value) on an address corresponding to the target line, the terminal 2A attempts to gain access to the image forming apparatus 1A (Step #773). When the priorities-assigned character string 41 shown in FIG. 10B is obtained, the terminal 2A attempts to gain access to the device corresponding to "192.168.2.2" for IPv4 as shown in the character string at the top line.

If the access is obtained successfully, i.e., if the terminal 2A can gain access to the image forming apparatus 1A (Yes in Step #774), then the second job commanding portion 204 instructs the image forming apparatus 1A to execute a print job by sending the document data 73 through the wireless LAN communication device 20f, the near field communication device 20g, or the mobile phone communication device 20h (Step #775).

If the access fails (No in Step #774), then the second job commanding portion 204 makes, as a target, the next line indicated in the priorities record of the priorities-assigned character string 41 (Step #777 and Step #772). Then, based on the information (type and value) on an address corresponding to the target line, the terminal 2A attempts to gain access to the image forming apparatus 1A (Step #772). However, if no more lines are left (Yes in Step #776), then the second job commanding portion 204 finishes the series of processing shown in FIG. 14.

As discussed above, the second job commanding portion 204 gives attention to the lines shown in the priorities-assigned character string 41, one by one, from top to down, and attempts to obtain access to the image forming apparatus 1A based on the address information corresponding to the target line until the terminal 2A gains access to the image forming apparatus 1A successfully.

The terminal 2A is not capable of obtaining access to the image forming apparatus 1A by using an electronic mail address. In view of this, if the target address is an electronic mail address, then the first job commanding portion 203 and the second job commanding portion 204 instruct the image forming apparatus 1A to execute a print job by sending, to the target electronic mail address, an e-mail message to which the document data 73 is attached. In response to the receipt of the e-mail message, the image forming apparatus 1A sends acknowledgment to the terminal 2A. When receiving the acknowledgment from the image forming apparatus 1A, the terminal 2A assumes that the access was successfully obtained.

The address information registration processing portion 205 regards, as an appropriate address 43, the address used for the case where the first job commanding portion 203 or the second job commanding portion 204 gives a print job command, and associates the appropriate address 43 with the image forming apparatus 1A to store the resultant into the address information storage portion 206.

Next time when instructing the image forming apparatus 1A to execute a job, the terminal 2A reads out, from the address information storage portion 206, the appropriate address 43 associated with the image forming apparatus 1A without the processing for generating the two-dimensional barcode 42 in the image forming apparatus 1A. The terminal 2A then uses the appropriate address 43 to instruct the image forming apparatus 1A to execute a job. If the terminal 2A fails to instruct the image forming apparatus 1A to execute a job by using the appropriate address 43, then the terminal 2A reads out, from the address information storage portion 206, the priorities-assigned character string 41 associated with the image forming apparatus 1A, and gives a job command according to the steps as described above with reference to FIG. 13 or FIG. 14.

Figure 15:
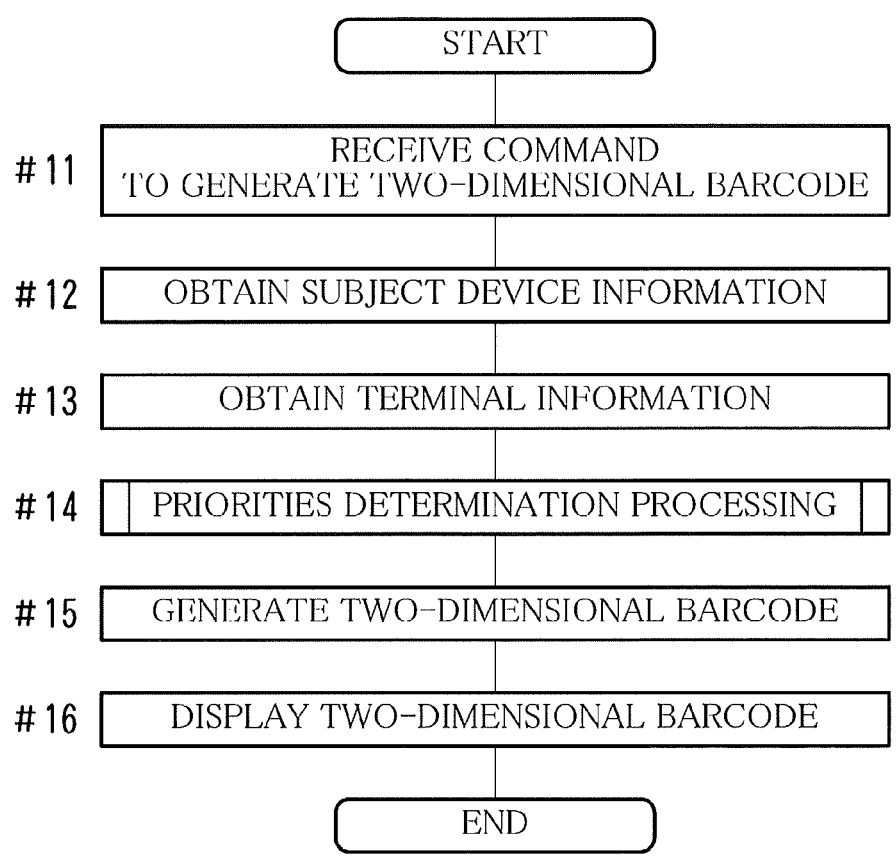
FIG. 15 is a flowchart depicting an example of the flow of the entire processing performed by an image forming apparatus.
Figure 16:
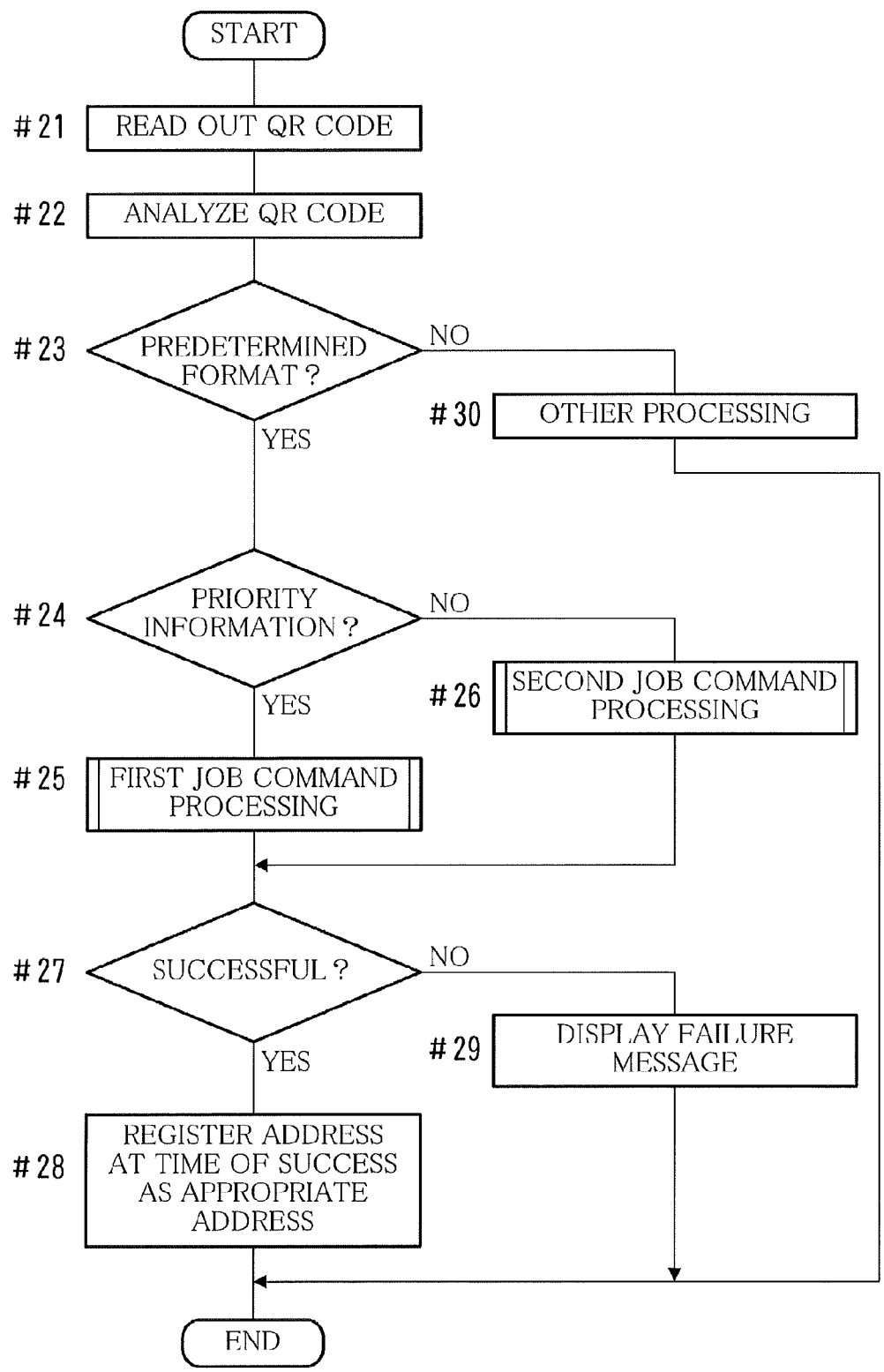
FIG. 16 is a flowchart depicting an example of the flow of the entire processing performed by a terminal.

FIG. 15 is a flowchart depicting an example of the flow of the entire processing performed by the image forming apparatus 1. FIG. 16 is a flowchart depicting an example of the flow of the entire processing performed by the terminal 2.

The description goes on to the entire processing flow performed by the image forming apparatus 1 and the terminal 2 according to the first embodiment with reference to the flowcharts of FIGS. 15 and 16.

When receiving a command to generate a two-dimensional barcode and a designation of a format of the two-dimensional barcode (Step #11 of FIG. 15), the image forming apparatus 1 obtains the subject device information 71 of the image forming apparatus 1 itself (Step #12), and also obtains the terminal information 72 of the terminal 2 of the user (Step #13). The image forming apparatus 1 determines the priorities of the addresses to be used for access from the terminal 2 to the image forming apparatus 1 based on the subject device information 71 and the terminal information 72 (Step #14). The determination processing is described earlier with reference to FIGS. 6-9.

The image forming apparatus 1 generates a priorities-assigned character string 41 having the designated format based on the determined priorities, and converts the generated priorities-assigned character string 41 into a two-dimensional barcode 42 (Step #15). The image forming apparatus 1 then displays the two-dimensional barcode 42 (Step #16).

The terminal 2 performs the processing as described below. The processing is described by taking an example in which the image forming apparatus 1A displays the two-dimensional barcode 42, and the user uses, as the terminal 2, the terminal 2A.

When reading out the two-dimensional barcode 42 (Step #21 of FIG. 16), the terminal 2A analyzes the two-dimensional barcode 42 to convert the same into a character string (Step #22).

If the character string has the format shown in FIG. 10A or FIG. 10B (Yes in Step #23), then the terminal 2 performs processing for instructing the image forming apparatus 1A to execute a job based on the character string (priorities-assigned character string 41) (Step #24 through Step #26). If the priorities-assigned character string 41 contains an item number for each address (has a priorities record) as shown in FIG. 10A (Yes in Step #24), then the terminal 2 performs the processing for giving a job command according to the steps shown in FIG. 13 (Step #25). In contrast, if the priorities-assigned character string 41 does not contain an item number for each address as shown in FIG. 10B (No in Step #24), then the terminal 2 performs the processing for giving a job command according to the steps shown in FIG. 14 (Step #26).

If the job command is successfully given (Yes in Step #27), then the terminal 2 regards the address used to give the job command as the appropriate address 43, associates the appropriate address 43 with the instructed image forming apparatus 1, namely, the image forming apparatus 1A, and stores the resultant (Step #28). Further, the priorities-assigned character string 41 obtained in Step #22 is also associated with the image forming apparatus 1A and stored.

If failing to give the job command (No in Step #27), then the terminal 2 displays a message indicating that a job command cannot be given to the image forming apparatus 1A (Step #29).

If the character string obtained in Step #22 does not correspond to any of the formats shown in FIGS. 10A and 10B (No in Step #23), then the terminal 2A performs processing other than the processing for giving a job command appropriately based on the character string obtained (Step #30).

According to the first embodiment, the user does nothing but take an image of the two-dimensional barcode 42 by means of the terminal 2 to use an appropriate one of addresses of the image forming apparatus 1. Thereby, the user can communicate with the image forming apparatus 1. In short, it is possible to select an address of the image forming apparatus 1 more easily than is conventionally possible.

The terminal 2 selects the addresses of the image forming apparatus 1 in a preferable order and uses the selected addresses in accordance with the preferable order. This makes it possible to shorten the time necessary to establish connection between the image forming apparatus 1 and the terminal 2, makes it possible to shorten the time necessary to give a job command from the terminal 2 to the image forming apparatus 1, and makes it possible to reduce the frequency of the occurrence of so-called communication timeout.

In the first embodiment, the priorities of addresses are determined depending on communication methods that can be performed between the image forming apparatus 1 and the terminal 2. The priorities of addresses may be determined in view of the environment in which the terminal 2 is used. For example, when the terminal 2 is used only in a segment in which the image forming apparatus 1 is also located, it is possible to give a higher priority to a host name than to a DNS name. Alternatively, when the terminal 2 has an opportunity to gain access to the image forming apparatus 1 via the Internet, it is possible to give a higher priority to a DNS name than to a host name. Information on environment in which the terminal 2 is used is preferably entered into the image forming apparatus 1 by the user.

Which of the BD address and the electronic mail address is to be given a higher priority may be determined in accordance with the number of terminals 2. To be specific, when the number of terminals 2 per image forming apparatus 1 is smaller than a predetermined number, a period of time during which the near field communication device 10i of the image forming apparatus 1 does not establish session with any other devices is probably long enough. In view of this, it is preferable that a higher priority is given to the BD address than to the electronic mail address. In contrast, when the number of terminals 2 per image forming apparatus 1 is equal to or greater than the predetermined number, it is preferable that a higher priority is given to the electronic mail address than to the BD address so as to ensure the receipt of a job command.

The terminal 2 takes an image of the two-dimensional barcode 42, and then determines the appropriate address 43 to give a job command to the image forming apparatus 1. Instead of giving a job command, however, the terminal 2 may determine the appropriate address 43 by sending dummy data to the image forming apparatus 1 on trial.

The terminal 2 gives a job command to the image forming apparatus 1 by using addresses in order from one given the highest priority. Then, at a time when the job command is successfully given, the appropriate address 43 is determined. Instead of this, the following arrangement is also possible. To be specific, a job command is given or a communication test is conducted by using all the addresses indicated in the priorities-assigned character string 41. Then, an address with which the communication time has the shortest may be determined to be the appropriate address 43.

[Second Embodiment]

Figure 17:
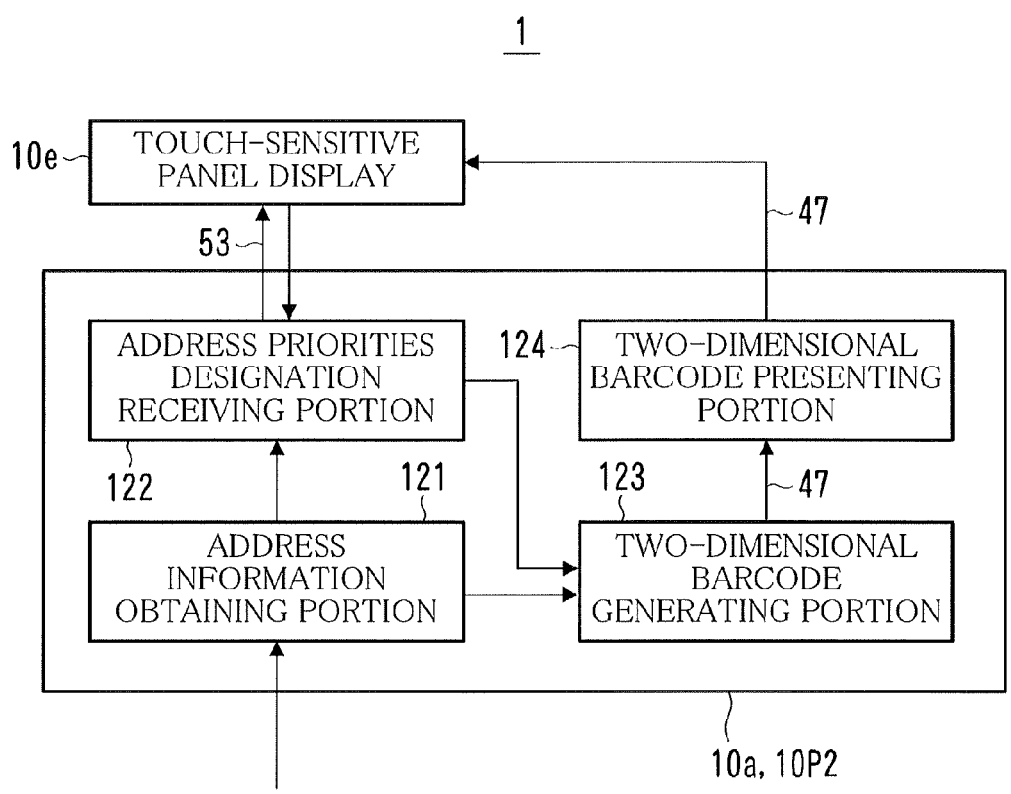
FIG. 17 is a diagram showing a modification of the functional configuration of an image forming apparatus.
Figure 18:
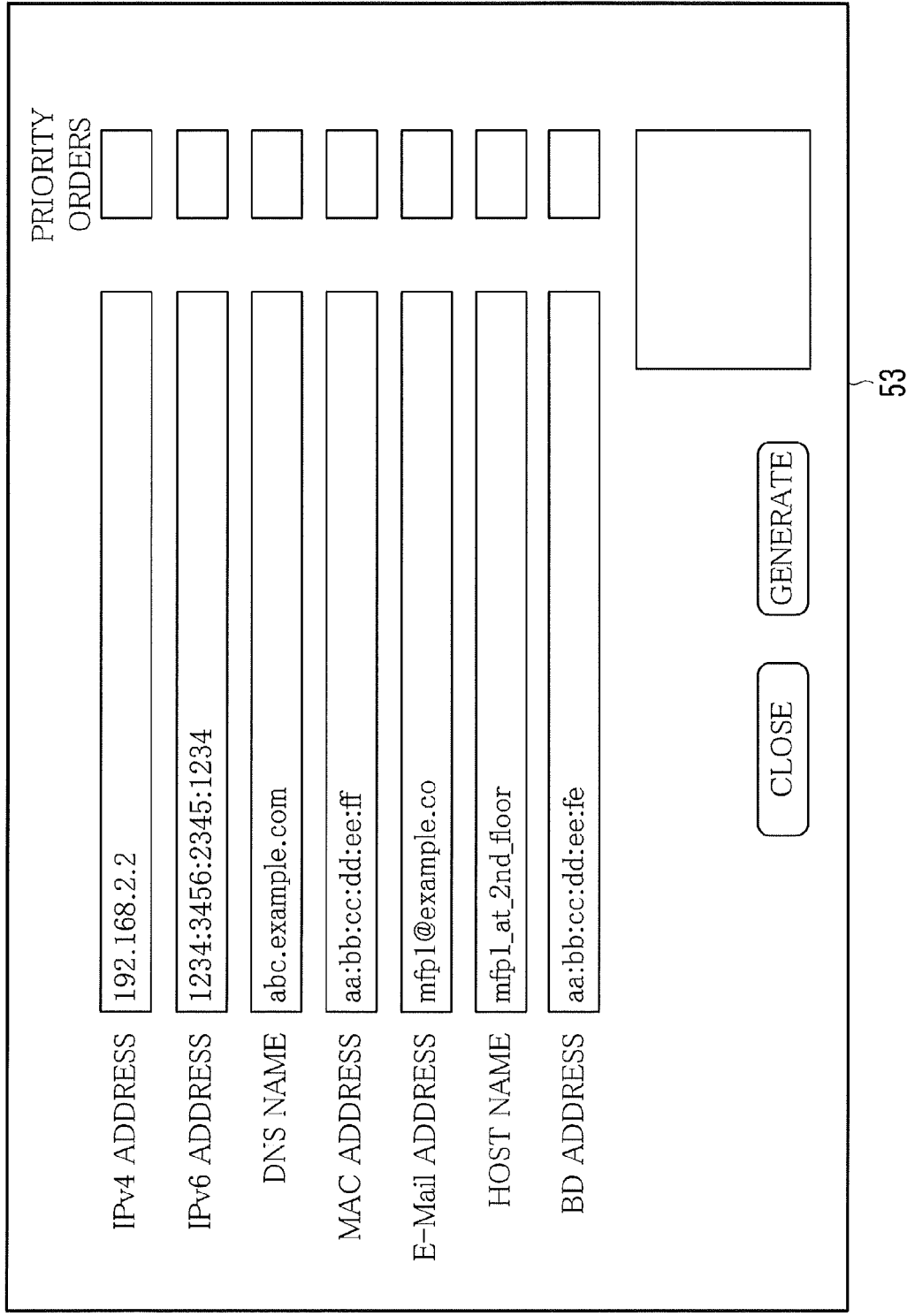
FIG. 18 is a diagram showing an example of an initial state of a priorities designation screen.
Figure 19:
FIG. 19 is a diagram showing an example of a priorities designation screen in which a two-dimensional barcode is placed.
Figure 20:
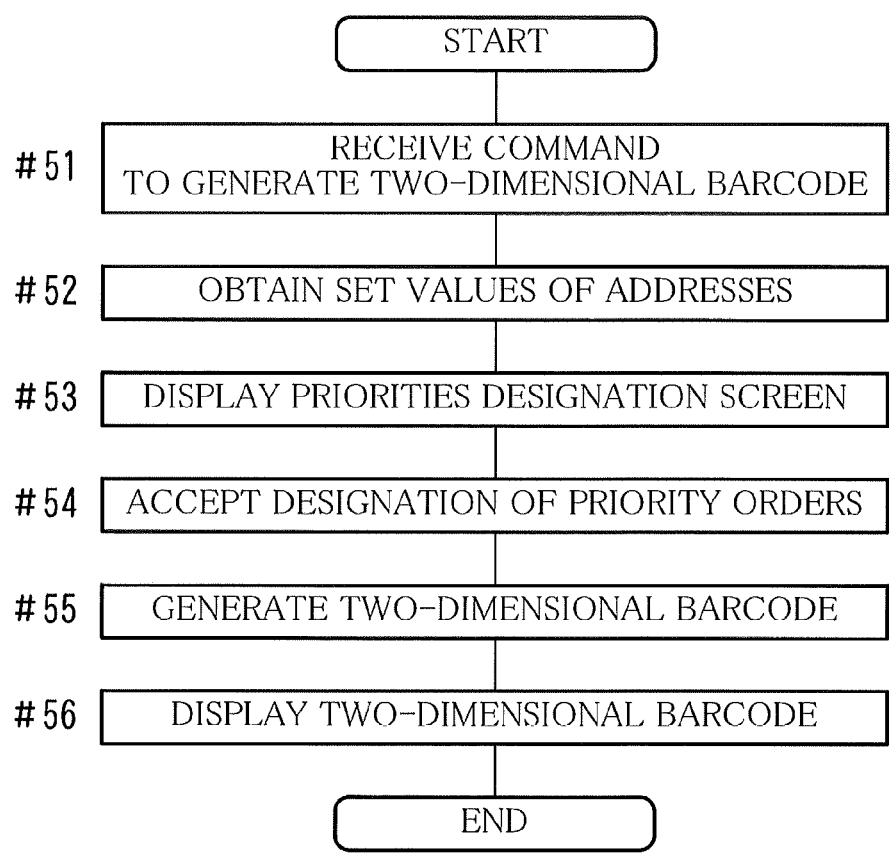
FIG. 20 is a flowchart depicting a modification of the flow of the entire processing performed by an image forming apparatus.

FIG. 17 is a diagram showing a modification of the functional configuration of the image forming apparatus 1. FIG. 18 is a diagram showing an example of an initial state of a priorities designation screen 53. FIG. 19 is a diagram showing an example of the priorities designation screen 53 in which a two-dimensional barcode 47 is placed. FIG. 20 is a flowchart depicting a modification of the flow of the entire processing performed by the image forming apparatus 1.

In the first embodiment, it is the image forming apparatus 1 that determines priorities of addresses of the image forming apparatus 1 based on the predetermined rules. In the second embodiment, a user designates the priorities.

The overall configuration of the network system 3 according to the second embodiment is the same as that of the first embodiment as shown in FIG. 1.

The hardware configuration of each of the image forming apparatus 1 and the terminal 2 is similar to that of the first embodiment as shown in FIGS. 2 and 3. However, in the image forming apparatus 1 of the second embodiment, a server program 10P2 instead of the server program 10P1 (see FIG. 4) is stored in the ROM 10c or the large-capacity storage 10d.

The server program 10P2 implements the functions of an address information obtaining portion 121, an address priorities designation receiving portion 122, a two-dimensional barcode generating portion 123, a two-dimensional barcode presenting portion 124, and so on, all of which are shown in FIG. 17.

Description goes on to the processing performed by the address information obtaining portion 121 through the two-dimensional barcode presenting portion 124.

The address information obtaining portion 121 obtains a set value of each type of address of the subject image forming apparatus 1 by making an inquiry to the operating system or the like.

The address priorities designation receiving portion 122 performs processing for prompting the user to designate the priority order of each address in the following manner.

The address priorities designation receiving portion 122 displays the priorities designation screen 53 as that shown in FIG. 18 on the touch-sensitive panel display 10e.

The user operates the touch-sensitive panel display 10e or the operation key panel 10f to enter the priority order of each address on the priorities designation screen 53. The address priorities designation receiving portion 122 accepts the priority orders thus entered.

The two-dimensional barcode generating portion 123 generates a priorities-assigned character string indicating the priority order of each address designated by the user, and converts the priorities-assigned character string into the two-dimensional barcode 47.

The format of the priorities-assigned character string is the same as that of the priorities-assigned character string 41 according to the first embodiment. To be specific, one of the two formats shown in FIGS. 10A and 10B is used. Which format is to be used may be designated by the user or may be determined in advance.

The two-dimensional barcode presenting portion 124 displays, on the touch-sensitive panel display 10e, the two-dimensional barcode 47 generated by the two-dimensional barcode generating portion 123. For example, the two-dimensional barcode 47 is overlaid and displayed on the priorities designation screen 53 as shown in FIG. 19.

The entire processing flow by the image forming apparatus 1 is shown in FIG. 20. To be specific, when accepting a command to generate a two-dimensional barcode and designation of a format of the two-dimensional barcode (Step #51), the image forming apparatus 1 obtains set values of the individual addresses of the image forming apparatus 1 itself (Step #52). The image forming apparatus 1 then displays the priorities designation screen 53 (see FIG. 18) (Step #53).

The user enters the priority order of each address on the priorities designation screen 53. When accepting the priority orders thus entered (Step #54), the image forming apparatus 1 generates a two-dimensional barcode 47 (Step #55) to display the same as shown in FIG. 19 (Step #56).

The processing by the terminal 2 is the same as that by the terminal 2 of the first embodiment. To be specific, when taking an image of the two-dimensional barcode 47, the terminal 2 converts the two-dimensional barcode 47 into a priorities-assigned character string. The terminal 2 then gains access to the image forming apparatus 1 based on the priorities-assigned character string 46.

According to the second embodiment, even if the image forming apparatus 1 is not equipped with the function to determine which of the addresses is given a higher priority, it is possible to cause the terminal 2 to select an appropriate address for the image forming apparatus 1.

As discussed above, according to the first and second embodiments, it is possible for the user to remotely use an image forming apparatus given a plurality of addresses more easily than is conventionally possible.

In the first and second embodiments, the image forming apparatus 1 outputs the two-dimensional barcodes 42 and 47 respectively by displaying the same on the touch-sensitive panel display 10e. Instead of this, however, the image forming apparatus 1 may output the two-dimensional barcodes 42 and 47 by printing the same on paper. In such a case, the user preferably uses the terminal 2 to input the two-dimensional barcodes 42 and 47 by taking an image of the paper.

In the first and second embodiments, the image forming apparatus 1 generates the two-dimensional barcodes 42 and 47 respectively. Instead of this, other device may generate the two-dimensional barcodes 42 and 47. For example, a server on the Interment (web server or cloud server) may generate the two-dimensional barcodes 42 and 47. In such a case, the functions shown in FIG. 4 or the functions shown in 17 may be provided in the server. Then, the two-dimensional barcodes 42 and 47 generated by the server may be outputted by displaying or printing the same by means of the image forming apparatus 1. If information on set values of the addresses of the image forming apparatus 1 cannot be obtained, the user is preferably prompted to enter the set values and send the same to the server. The user may enter the set values by using the touch-sensitive panel display 10e or the operation key panel 10f of the image forming apparatus 1, or a personal computer.

In the first and second embodiments, the types of addresses shown in FIGS. 10A and 10B are used. Other types of addresses may be used depending on communication methods adaptable to the image forming apparatus 1. For example, addresses for communication methods such as ZigBee, wireless USB, infrared communication, and direct Wi-Fi may be used.

In particular, when addresses for direct Wi-Fi are used, the priorities may be determined, for example, in the following manner.

When connection from the wireless LAN communication device 20f of the terminal 2 to a direct Wi-Fi device of the image forming apparatus 1 (so-called AP mode connection) takes precedence over connection from the wireless LAN communication device 20f of the terminal 2 to a base station of a segment on which the image forming apparatus 1 is located (so-called router mode connection), a determination is preferably made in such a manner that the direct Wi-Fi device of the image forming apparatus 1 takes precedence over the IP address for IPv4 and the IP address for IPv6. However, if limits are placed on the use of the functions of the image forming apparatus 1 for connection through the direct Wi-Fi, it is possible to determine the priority order of the direct Wi-Fi of the image forming apparatus 1 to be lower than the IP address for IPv4 and the IP address for IPv6.

In the first and second embodiments, the example is described in which the priorities of addresses of the multifunctional image forming apparatus 1 are determined and the determined priorities are used in the terminal 2. The present invention is not only limited thereto and is also applicable to the case where the priorities of addresses of a printer, facsimile terminal, or scanner having only one or a few functions are determined and the determined priorities are used in the terminal 2. The present invention is not only applicable to a print job command but also applicable to a scan job command or a fax transmission job command. A two-dimensional code may be used in order to cause the terminal 2 to get access to a Network Attached Storage (NAS) and an information home appliance.

In the first and second embodiments, a QR code (registered trademark) is used as the two-dimensional barcodes 42 and 47. Another type of two-dimensional barcode may be used as the two-dimensional barcodes 42 and 47. For example, an SP code, a CP code, a High Capacity Color Barcode (HCCB) may be used as the two-dimensional barcodes 42 and 47. Alternatively, a one-dimensional barcode or a color barcode may be used as the two-dimensional barcode 42 or 47.

It is to be understood that the configurations of the network system 3, the image forming apparatus 1, and the terminal 2, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A network system comprising:
an image forming apparatus having a plurality of addresses for communication including addresses corresponding to various different communication methods; and
a terminal used to operate the image forming apparatus from a remote location; wherein
the image forming apparatus includes a processor configured to generate a code indicating the addresses and priority orders of the addresses, and output the code generated, and
the terminal includes a reader configured to obtain the code outputted, and a terminal processor configured to perform transmission processing for sending data to the image forming apparatus by using, based on the code obtained, the addresses in order from an address which is given the priority order higher than any other of the priority orders.

2. The network system according to claim 1, wherein
the terminal includes a storage portion configured to store, as an appropriate address, one of the addresses by using which the transmission processing was fully performed first, and
when performing the transmission processing next time, the terminal processor uses the appropriate address stored in the storage portion.

3. The network system according to claim 1, wherein the processor generates the code by converting a character string into a two-dimensional barcode, the character string indicating the addresses, sequence numbers of the addresses, and priority information listing the sequence numbers in accordance with the priority orders of the addresses.

4. The network system according to claim 1, wherein the processor generates the code by converting, into a two-dimensional barcode, a character string in which the addresses are listed in accordance with the priority orders of the addresses.

5. The network system according to claim 1, wherein
the image forming apparatus includes an obtaining portion configured to obtain terminal information regarding the terminal, and
based on the terminal information, the processor selects, from among the addresses, an address usable for the transmission processing to generate a code indicating the address selected.

6. The network system according to claim 1, wherein, if the addresses include an IP address and a name-related address which contains a host name, and, if the IP address is given based on a Dynamic Host Configuration Protocol (DHCP), then the processor generates a code indicating, as the priority order of the name-related address, a priority order higher than the priority order of the IP address.

7. The network system according to claim 1, wherein, if the addresses include an IP address for Internet Protocol version 4 (IPv4) and an IP address for Internet Protocol version 6 (IPv6), and, if both the IP address for IPv4 and the IP address for IPv6 are enabled, then the processor generates a code indicating, as the priority order of the IP address for IPv4, a priority order higher than the priority order of the IP address for IPv6.

8. The network system according to claim 1, wherein, if the addresses include a Domain Name System (DNS) name and a host name, and, if the terminal is used only in a segment on which the image forming apparatus is located, then the processor generates a code indicating, as the priority order of the host name, a priority order higher than the priority order of the DNS name; and if the terminal performs the transmission processing from a location other than the segment, then the processor generates a code indicating, as the priority order of the DNS name, a priority order higher than the priority order of the host name.

9. The network system according to claim 1, wherein, when a function to print an image onto paper based on a received e-mail message is enabled, the processor generates a code indicating, as one of the addresses, an electronic mail address of the image forming apparatus.

10. The network system according to claim 1, wherein the processor generates a code indicating, as the priority orders of the addresses, priority orders designated by the user.

11. A code providing device comprising a processor configured to:
generate, as a code used in a terminal for performing communication with an image forming apparatus having a plurality of addresses for communication including addresses corresponding to various different communication methods, a code indicating the addresses and priority orders of the addresses; and
output the code.

12. A terminal used to operate an image forming apparatus from a remote location, the apparatus having a plurality of addresses for communication including addresses corresponding to various different communication methods, the terminal comprising:
a reader configured to obtain a code indicating the addresses and priority orders of the addresses, and
a terminal processor configured to perform transmission processing for sending data to the image forming apparatus by using, based on the code obtained, the addresses in order from an address which is given the priority order higher than any other of the priority orders.

13. A non-transitory computer-readable storage medium storing thereon a computer program used in a computer to generate a code, the code being used in a terminal for performing communication with an image forming apparatus having a plurality of addresses for communication including addresses corresponding to various different communication methods, the computer program causing the computer to perform processing comprising:
generating a code indicating the addresses and priority orders of the addresses; and
outputting the code.

14. The non-transitory computer-readable storage medium of claim 13, wherein the processing further comprises:
obtaining terminal information regarding the terminal, and
based on the terminal information, selecting, from among the addresses, an address usable for the transmission processing to generate a code indicating the address selected.

15. A non-transitory computer-readable storage medium storing thereon a computer program used in a computer to operate an image forming apparatus from a remote location, the apparatus having a plurality of addresses for communication including addresses corresponding to various different communication methods, the computer program causing the computer to perform processing comprising:
obtaining a code indicating the addresses and priority orders of the addresses; and
sending data to the image forming apparatus by using, based on the code obtained, the addresses in order from an address which is given the priority order higher than any other of the priority orders.

* * * * *